United States Patent [19]
Kelly

[11] 4,115,276
[45] Sep. 19, 1978

[54] MULTI-PORT BACKWASH VALVE

[75] Inventor: Virgil M. Kelly, Los Angeles, Calif.

[73] Assignee: Purex Corporation, Lakewood, Calif.

[21] Appl. No.: 783,978

[22] Filed: Apr. 4, 1977

[51] Int. Cl.² .............................................. B01D 35/22
[52] U.S. Cl. ................................ 210/425; 137/625.29; 210/169
[58] Field of Search ........................ 210/169, 424, 425; 137/625.11, 625.29, 625.46

[56] References Cited

U.S. PATENT DOCUMENTS

| 2,209,989 | 8/1940 | McCanna | 137/625.29 |
| 2,613,056 | 10/1952 | Hughes | 137/625.29 |
| 3,365,064 | 1/1968 | Horan, Jr. | 210/425 X |

FOREIGN PATENT DOCUMENTS

| 336,238 | 3/1959 | Switzerland | 137/625.29 |

*Primary Examiner*—William A. Cuchlinski, Jr.
*Attorney, Agent, or Firm*—William W. Haefliger

[57] ABSTRACT

A multi-ported backwash valve for a swimming pool and filter, comprises:
(a) a valve rotor and a body having five ports communicating with the rotor, said ports including
 (i) a fluid inlet port,
 (ii) a first outlet port for fluid delivery to a container,
 (iii) a second outlet port for fluid delivery in a first selected path through filter means,
 (iv) a third outlet port for fluid delivery in a second selected path through filter means, and
 (v) a fourth outlet port for fluid delivery to discharge,
(b) the rotor having an axis and the body having an internal wall, the inlet port located at the internal wall, the first, second, third and fourth ports spaced about said axis,
(c) the rotor having a flow directing chamber to selectively place the inlet port in communication with the first through fourth ports, and other flow directing chamber structure to selectively and simultaneously intercommunicate pairs of the first through fourth ports.

19 Claims, 12 Drawing Figures

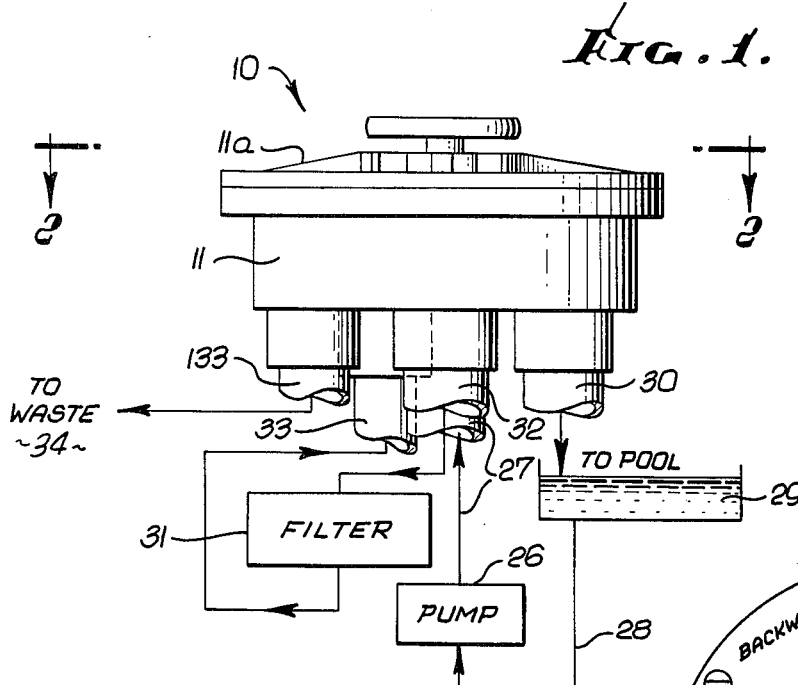
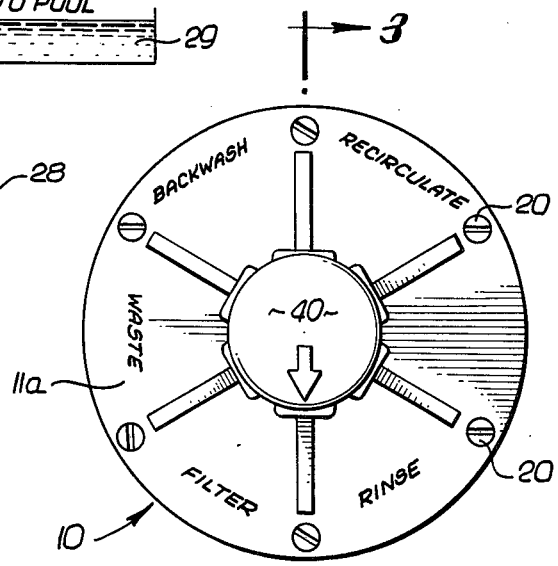
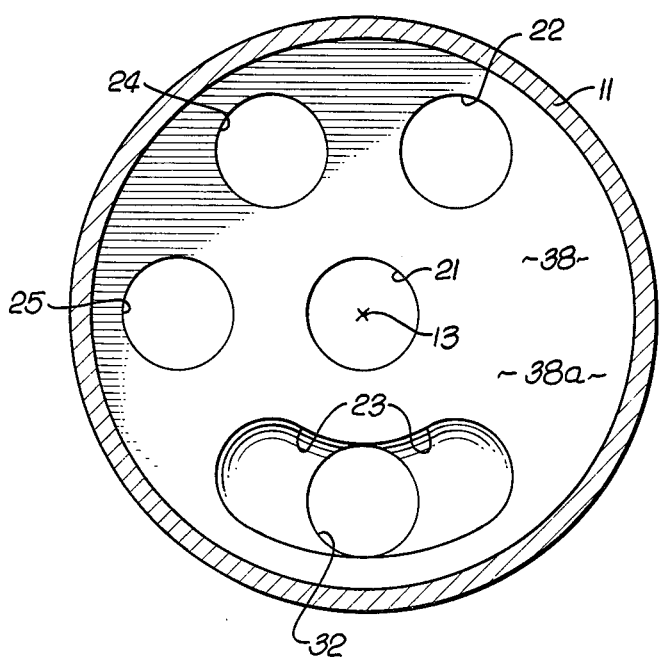
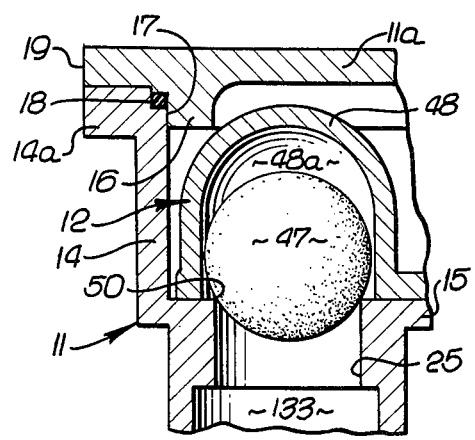

(FILTER MODE)

(WASTE MODE)

(BACKWASH MODE)

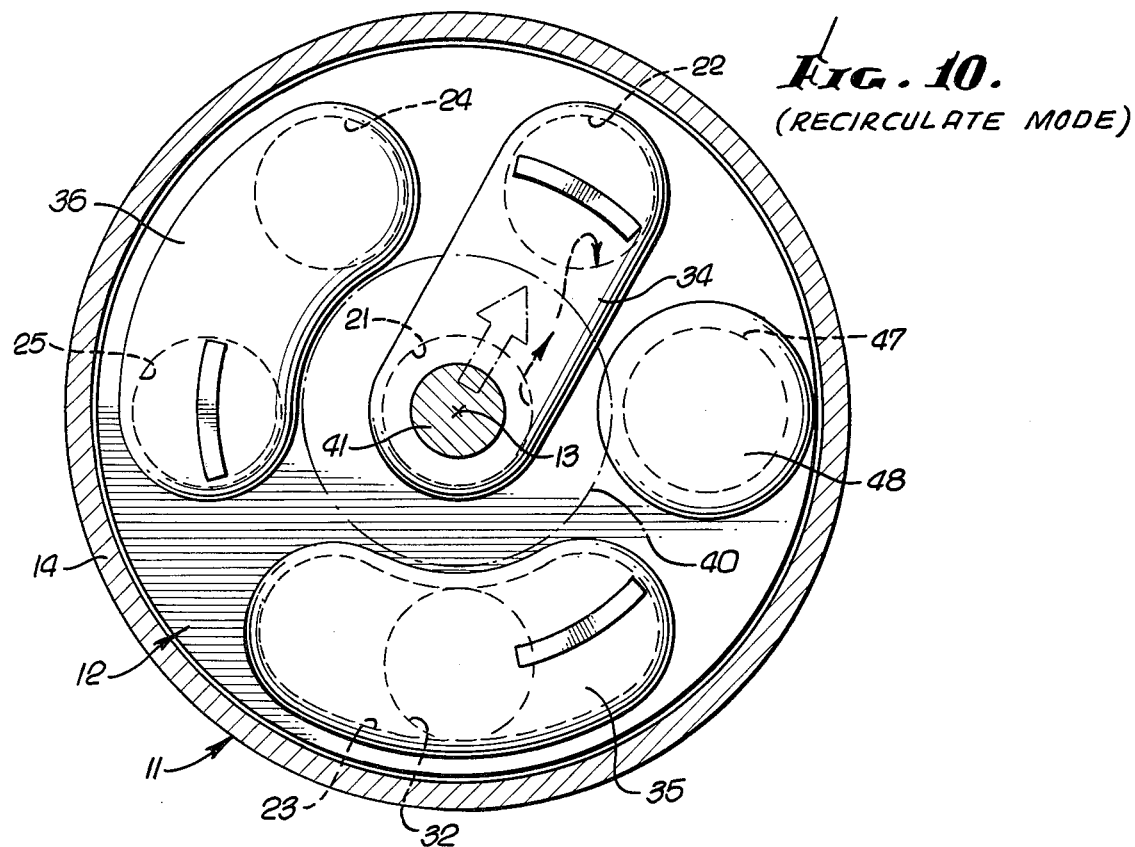
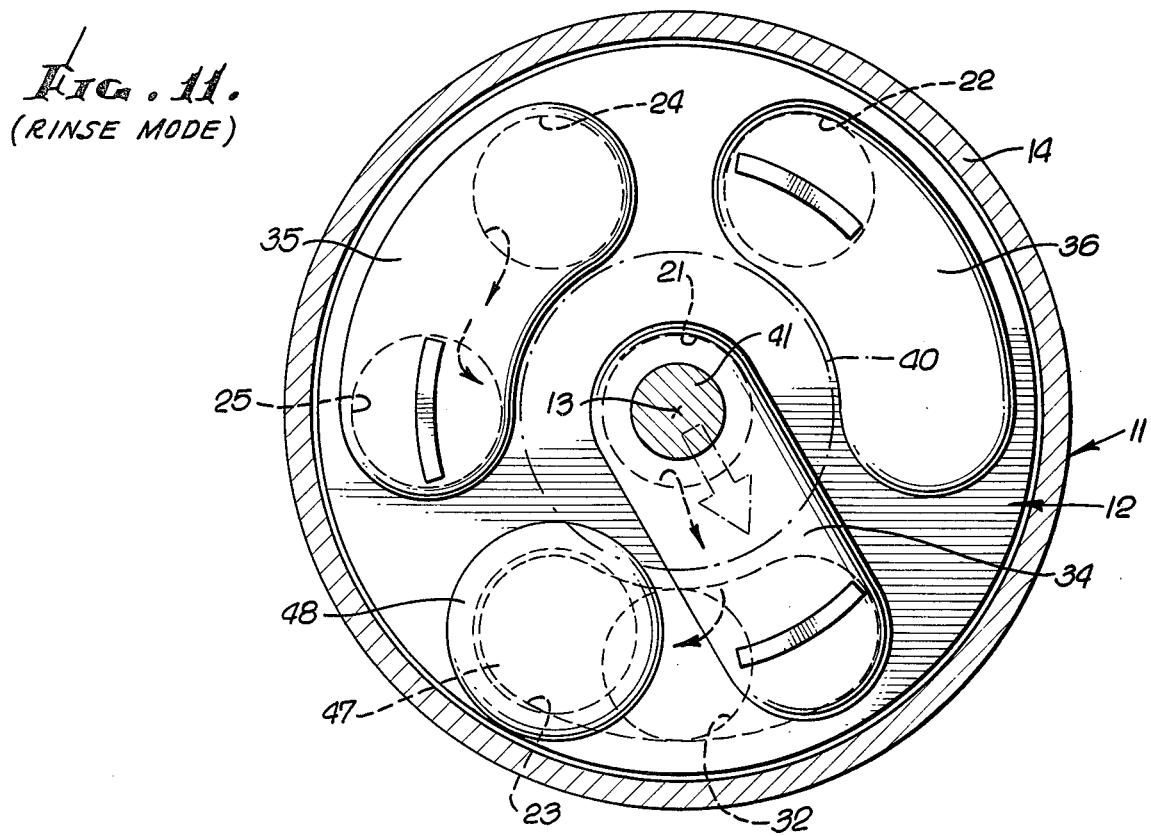

MULTI-PORT BACKWASH VALVE

BACKGROUND OF THE INVENTION

This invention relates generally to multi-ported valves usable in swimming pool filter systems, as well as other applications. More specifically, it concerns a valve of simple, economic design having five ports which variably intercommunicate to provide multiple functions, as will appear.

There is need for a simple, low-cost valve apparatus which will function with swimming pool filter systems as well as in other applications such as water treatment, chemical process fluid flow control, etc. Such a valve should be capable of multiple settings accommodating filtering, backwash of the filter as for example to waste, and rinsing of the filter. Also, in certain applications, as for example in use with swimming pools having spas, an additional setting, for recirculation, is desirable. No prior art valve of which I am aware possesses the capability for multiple mode settings as described, together with the simplicities now embodied in the five-port valve which is the subject of the present invention.

SUMMARY OF THE INVENTION

It is a major object of the invention to provide a multiple-port valve overcoming deficiencies of prior valves, as well as achieving the above described objectives. Fundamentally, the valve comprises:
(a) a valve rotor and a body having five ports communicating with the rotor, said ports including
  (i) a fluid inlet port,
  (ii) a first outlet port for fluid delivery to a container,
  (iii) a second outlet port for fluid delivery in a first selected path through filter means,
  (iv) a third outlet port for fluid delivery in a second selected path through filter means, and
  (v) a fourth outlet port for fluid delivery to discharge,
(b) the rotor having an axis and the body having an internal wall, the inlet port located at the internal wall, the first, second, third and fourth ports spaced about said axis,
(c) the rotor having a flow directing chamber to selectively place the inlet port in communication with the first through fourth ports, and other flow directing chamber structure to selectively and simultaneously intercommunicate pairs of the first through fourth ports.

As will appear, the fluid inlet port may receive water delivery from a pump taking suction from a swimming pool; the first outlet port may be connected to deliver water to a swimming pool; the second and third ports may be respectively connected to opposite sides of a water filter; and the fourth outlet port may discharge water to waste. Accordingly, the rotor may have a WASTE position in which the inlet port is connected with the fourth port, as via rotor chamber structure; and the rotor may have a RINSE position in which the second outlet port is placed in communication with the water inlet port via rotor chamber structure, at which time the third and fourth ports are also placed in intercommunication via the rotor structure. Finally, the rotor may have a RECIRCULATE position in which the inlet port communicates with the first outlet port via rotor chamber structure.

Further, the rotor chamber may define multiple waterways arranged in relation to the ports which terminate or open to the rotor at one internal wall of the body, to facilitate the selected intercommunications referred to, with optimum simplicity of valve construction.

These and other objects and advantages of the invention, as well as the detail of illustrated embodiment, will be more fully understood from the following description and drawings, in which:

DRAWING DESCRIPTION

FIG. 1 is a frontal elevation of a multiported backwash valve incorporating the invention;

FIG. 2 is a plan view on lines 2—2 of FIG. 1;

FIG. 6 is a plan view looking into the valve body, with the cover and rotor removed;

FIG. 10 is a view like that of FIG. 7, showing the rotor in recirculate mode position;

FIG. 11 is a view like that of FIG. 7, showing the rotor in rinse mode position; and FIG. 12 is a vertical section on lines 12—12 of FIG. 7.

DETAILED DESCRIPTION

Figure 3:
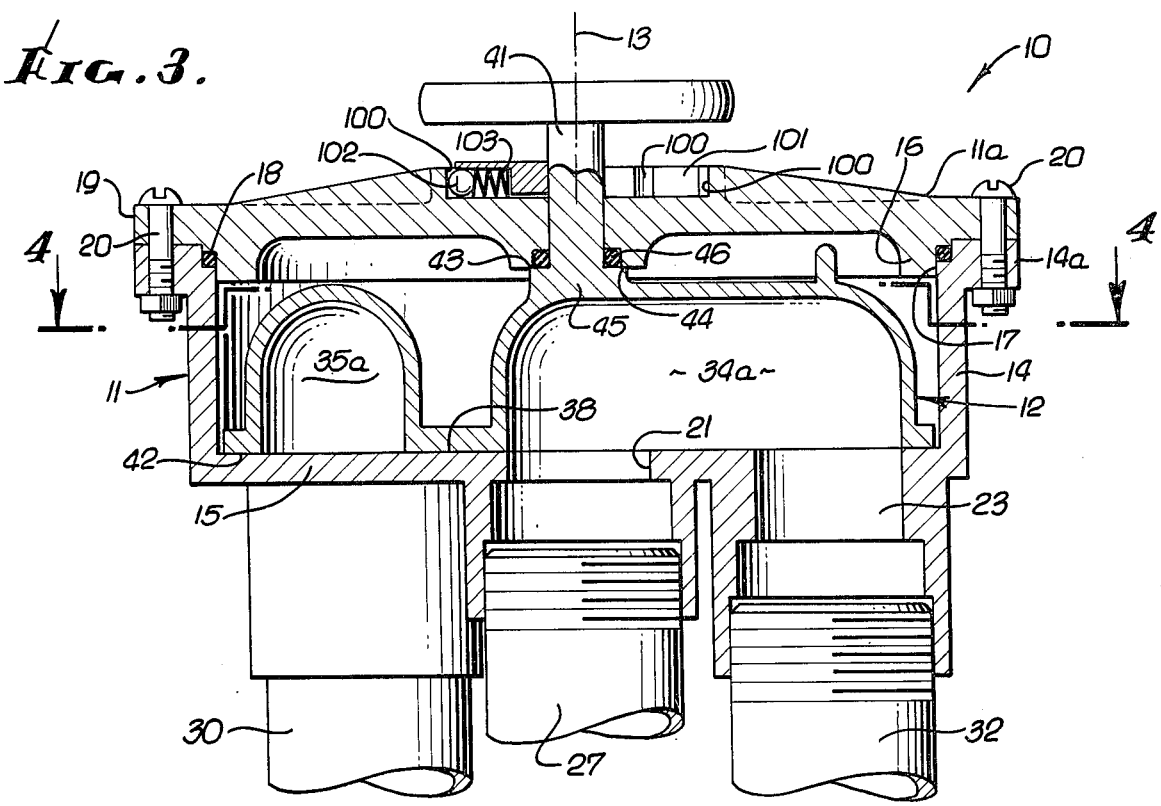
FIG. 3 is an enlarged vertical elevation, taken in section, on lines 3—3 of FIG. 4.
Figure 4:
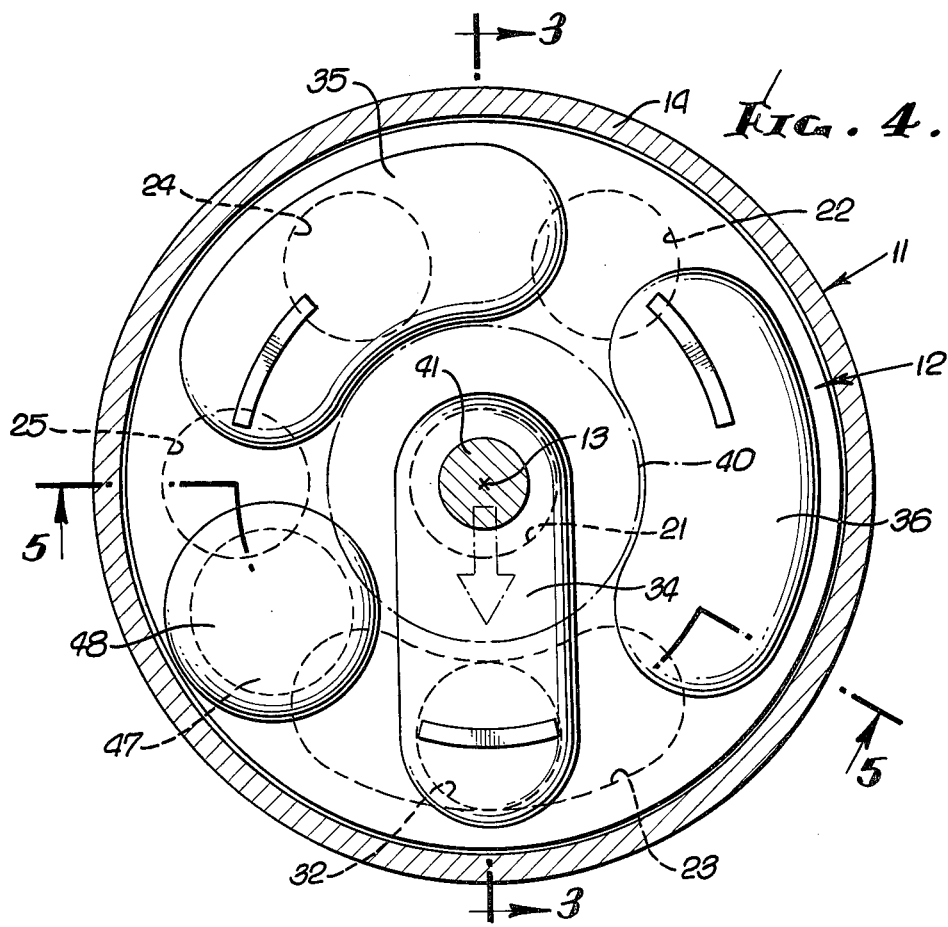
FIG. 4 is a horizontal section taken on lines 4—4 of FIG. 3.

In the drawings, the multi-ported backwash valve 10 is shown to include a valve body 11 which includes a cap 11a, and a rotor 12 rotatable within the body about a vertical axis 13. The body 11 may take the illustrated form where annular skirt 14 extends upwardly from a bottom plate 15, the skirt having an upper external flange 14a. The cap 11a has a downwardly protruding boss 16 fitting the body bore 17, and a seal 18 is provided therebetween. The cap also has an external flange 19 attached to body flange 14a as by removable fasteners such as bolts 20.

As seen in FIG. 6, the bottom wall of the body 11 forms five ports 21–25 identified as follows:

| Port | |
|---|---|
| 21 | pump port |
| 22 | pool port |
| 23 | first filter port (top, for example) |
| 24 | second filter port (bottom, for example) |
| 25 | waste port |

Port 21 is preferably located generally centrally, i.e. at or proximate axis 13, whereby water delivered from a pump 26 via line 27 to port 21 may be selectively delivered to other ports. Ports 22–25 are spaced about port 21, in satellite relation, and preferably at equal radial distances from port 21 or axis 13. Pump 26 typically takes suction via line 28 from pool 29. Water is returned to the pool via port 22 and line 30. Ports 23 and 24 respectively communicate with spaced apart portions of filter 31, via lines 32 and 33; for example, port 23 may communicate via line 32 with the top of the filter, whereas port 24 may communicate via line 33 with the bottom of the filter media. Port 25 communicates via line 133 with a waste zone 34.

Figure 7:
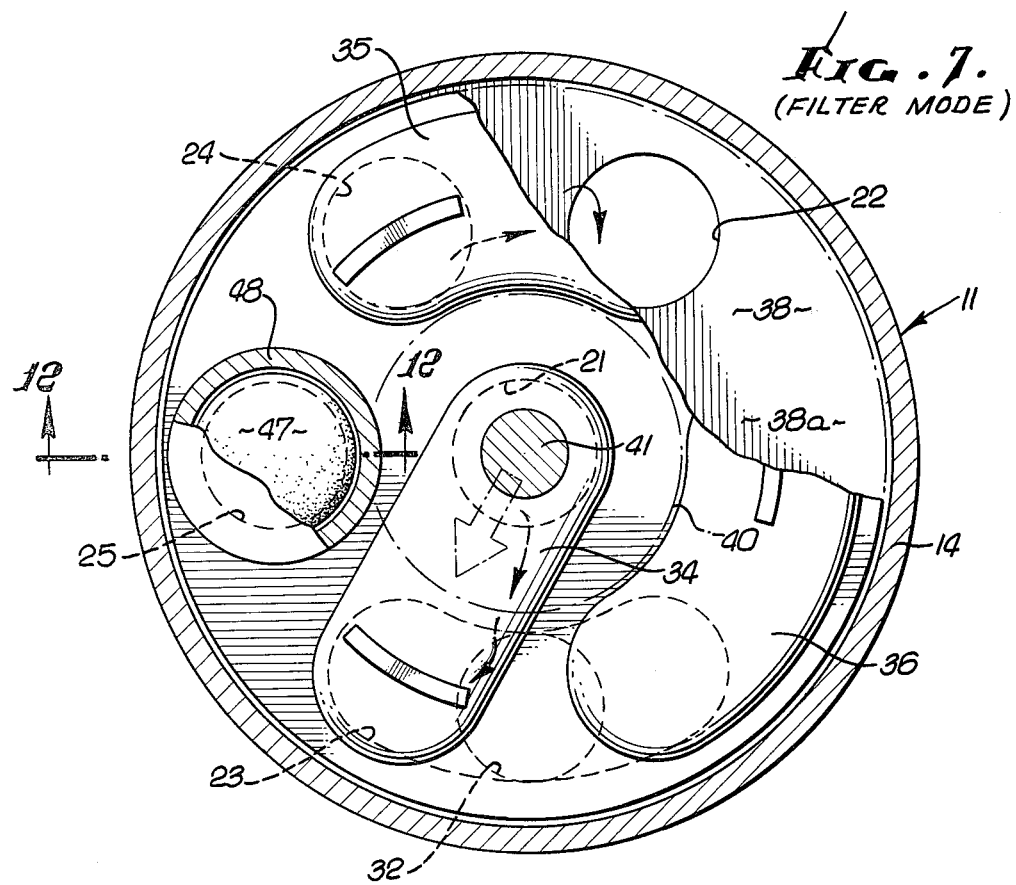
FIG. 7 is a plan view partly in section, showing the rotor in filter mode position.
Figure 9:
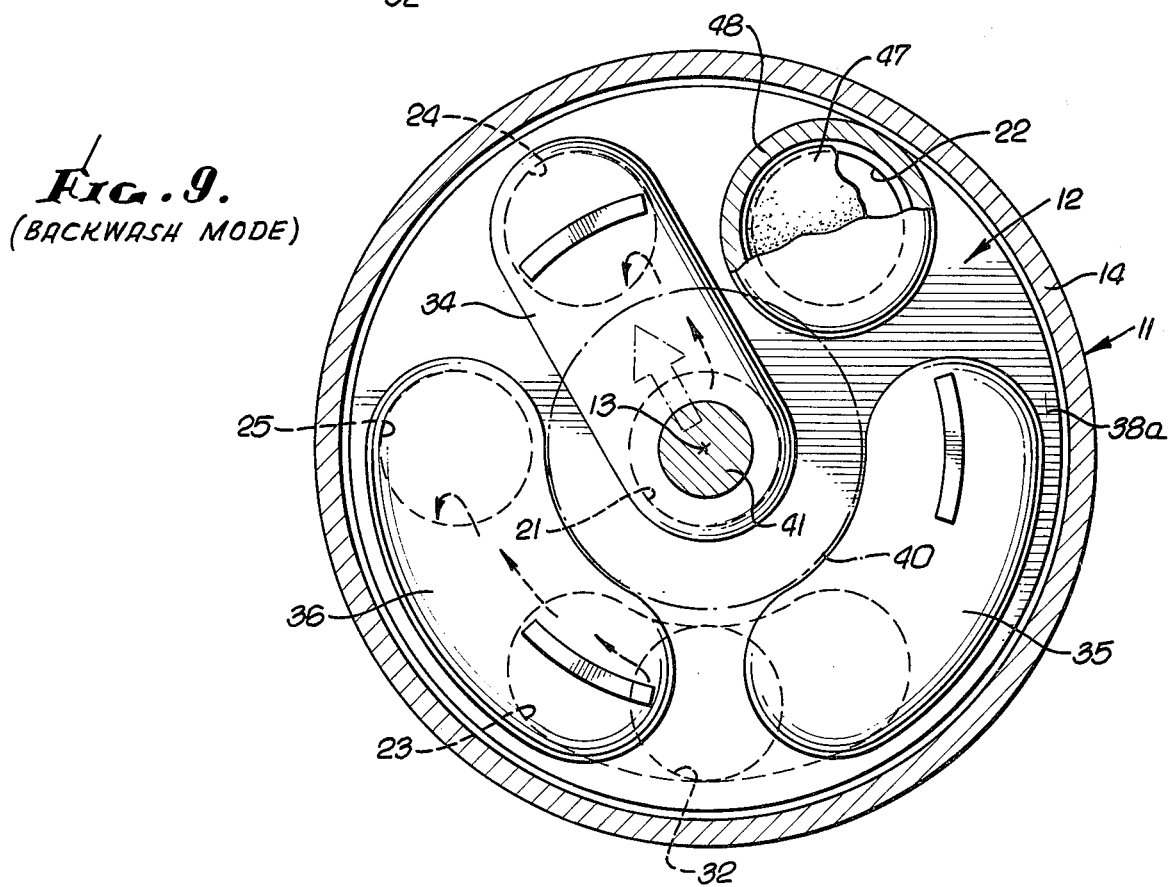
FIG. 9 is a view like that of FIG. 7, showing the rotor in backwash mode position.

The rotor 12 has water flow directing chamber structure characterized in that when the rotor is rotated to FILTER position (see FIG. 7 for example), the second outlet port 23 for water delivery forwardly through the filter 31 is placed in communication with the water inlet port 21 via such chamber structure, and the (third) port 24 and (first) port 22 are placed in communication through such chamber structure; further, when the rotor is placed in a BACKWASH position (see FIG. 9 for example), the (third) port 24 is placed in communication with the inlet port 21 via the rotor chamber structure, and the (second) port 23 is then placed in communication with the (fourth) port 25 via such chamber structure. For this purpose, the chamber structure in the rotor may advantageously include a first waterway defining chamber 34 (see also chamber interior 34a) which extends radially over port 21, and selectively over port 23 in FIG. 7 FILTER mode and over port 24 in FIG. 9 BACKWASH mode; further, the chamber structure may advantageously include a second waterway defining chamber 35 (see also chamber interior 35a in FIG. 3) which extends generally circumferentially to overlap and intercommunicate ports 24 and 22 in FILTER mode (see FIG. 7). The chamber structure may also advantageously include a third waterway defining chamber 36 which extends generally circumferentially to overlap and intercommunicate ports 23 and 25 in BACKWASH mode (see FIG. 9). In FIG. 7, chamber 36 overlaps port 23 and body wall 38 at locus 38a so as not to pass water, whereas in FIG. 9, chamber 35 overlaps port 23 and body wall 38 at locus 38a so as not to pass water.

FIG. 2 shows the various positions of the rotor, as may be selected by rotating handle 40 so that arrow 41 points to the printed words on the cap and designating the function or operation desired. Besides the FILTER and BACKWASH functions referred to, there are RINSE, RECIRCULATE and WASTE modes of operation, as shown. Handle 40 may project centrally above the cap, and may be connected to the rotor via an axial shaft 41, as seen in FIG. 3. That view also shows the bottom face 42 of the rotor held in close, sliding interengagement with the surface 38 of the wall 15, as by engagement at 43 of cap boss 44 with the top center of the rotor at 45. Annular seal 46 is provided at the engagement location. Structure 45 is integral with structure 34.

Figure 5:
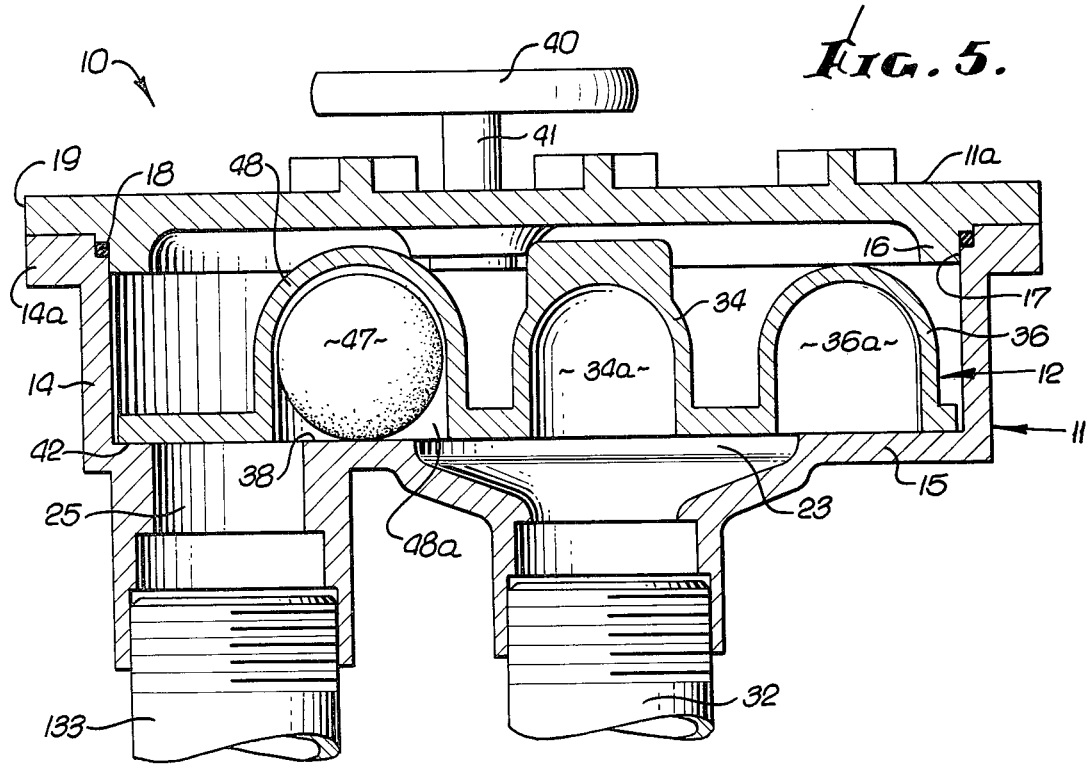
FIG. 5 is a vertical elevation, taken in section, on lines 5—5 of FIG. 4.

A plug, as at 47, is carried by the rotor for rotation therewith, in order to plug the (fourth) outlet port 25 to waste, when the rotor is in FILTER position (in FIG. 7), and to plug the (first) outlet port 22 to the pool, when the rotor is in BACKWASH position (see FIG. 9) The plug, as shown, may advantageously comprise a ball having an outer surface consisting of plastic, or an elastomer such as rubber. It is housed within the interior 48a of separate rotor chamber structure 48, best viewed in FIG. 12. The ball is free to drop partly into the ports that it plugs, as for example port 25 in FIGS. 7 and 12, positively sealing those ports; at the same time, when the rotor is rotated, the chamber structure 48 displaces the ball up and out of the port to ride on wall surface 38 (see FIG. 5) and thereafter to drop into another port in selected rotor position of the rotor. Note that the diameter of the ball is sufficiently greater than the diameter of the annular port which it plugs that only the lowermost portion of the ball (of maximum depth less than about ¼ the ball diameter) drops into the port. The seal is effected at annular port edge 50.

When the rotor is in FILTER position, water from the pump 26 enters the valve through port 21, flows into the hooded waterway 34a of the rotor to be conducted internally to exit the valve via port 23; it then flows via line 32 to the top of the filter, through the filter media to exit same at the filter bottom and return via line 33. The flow re-enters the valve through port 24 and then passes via waterway chamber 35 to pool port 22 for return to the pool 29 via line 31. At this time, ball 47 plugs waste port 25. Waterway 34a appears in FIG. 3.

When the filter is to be backwashed, the rotor is turned to BACKWASH position. The pump is not operated during such turning of the rotor. When the pump is operated after the rotor is turned to FIG. 9 position, the water's course is from the pool 29 through the pump 26 to port 21, thence through waterway 34a to port 24 and to the bottom of the filter via line 33. The resulting reverse flow through the filter backwashes and cleans the filter media, and the flow passes via line 32 to port 23 and is conducted via waterway chamber 36 to port 25 and to waste. In this mode, ball 47 plugs port 22.

Figure 8:
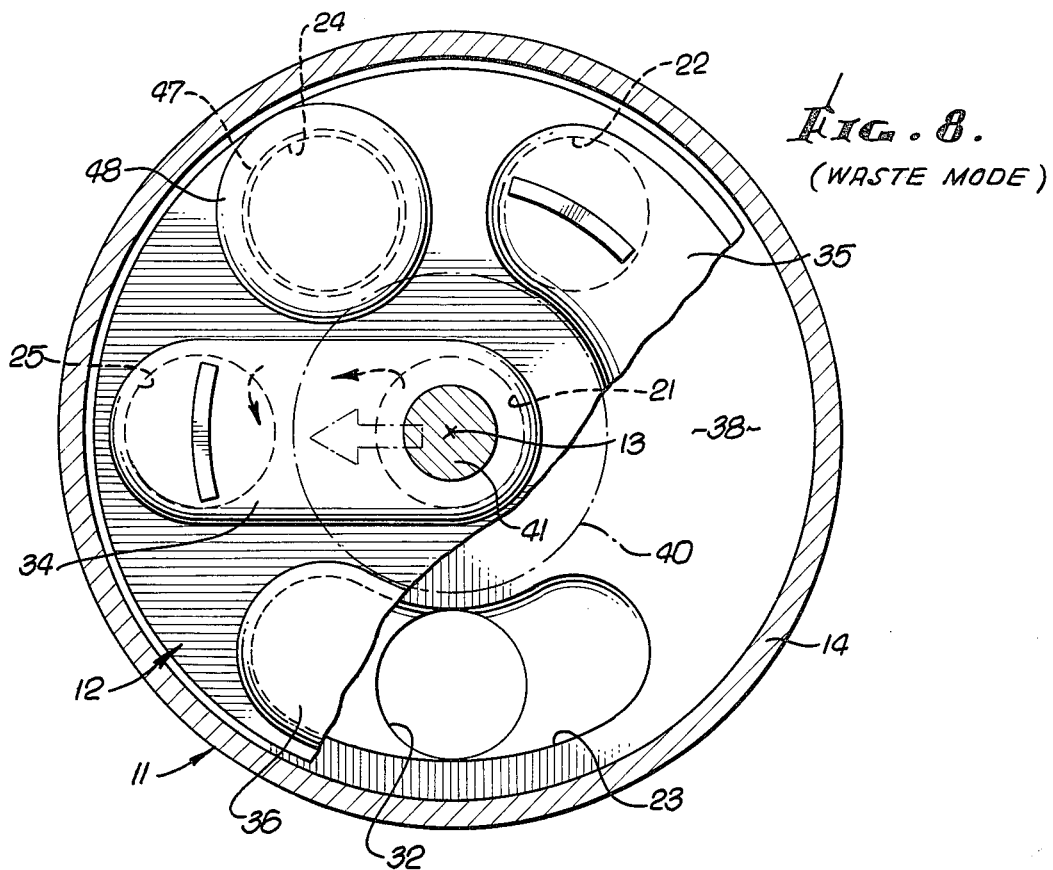
FIG. 8 is a view like that of FIG. 7, showing the rotor in waste mode position.

The rotor has a WASTE mode position (see FIG. 8) wherein the waterway 34a intercommunicates ports 21 and 25. When the pump is running, water is drawn through the vacuum connection port in the pool to the pump and then delivered to waste via the valve. In this position, ball 47 plugs port 24.

The rotor has a RINSE mode position (see FIG. 11) in which pool water is delivered via port 21, waterway 34a and port 23 to the top of the filter; the water circulates through the filter rinsing same and returns via line 33 to port 24. It then flows via waterway member 36 to port 25 and to waste. In this mode, the ball 47 overlies part of elongated port 23, but does not plug same.

Finally, FIG. 10 illustrates a recirculation position of the rotor, in which water supplied from the pool to port 21 returns to the pool via waterway 34a and port 22.

The filter media may be of any suitable type, and may consist of a bed of discrete granules to filter swimming pool water.

It will be noted that ports 23, 25, 24 and 22 are spaced apart about axis 13 at approximately 60 degree angles; also, that port 23 extends throughout approximately 60 degrees about axis 13.

Finally, FIG. 3 shows the provision of detent structure to releasably retain the rotor in each of its selected positions. For example, radially inwardly facing slots 100 are provided in the bore 101 in cap 11a, at circularly spaced locations corresponding to the selected rotor positions. A ball 102, spring urged at 103, is carried by the rotor shaft 41, as shown, to be urged part way into the detent slots as the rotor arrives at its selected positions.

I claim:

1. In a multi-ported backwash valve for a swimming pool and filter, the combination comprising
   (a) a valve rotor and a body having five ports communicating with the rotor, said ports including
      (i) a pool water inlet port,
      (ii) a first outlet port for water delivery to the pool,
      (iii) a second outlet port for water delivery forwardly through the filter, (iv) a third outlet port for water delivery reversely through the filter, and
(v) a fourth outlet port for water delivery to waste,
(b) the rotor having water flow directing chamber structure characterized in that when the rotor is in a FILTER position the second outlet port is placed in communication with the water inlet port via the chamber structure, and the third and first ports are placed in communication through the rotor chamber structure, and
(c) when the rotor is placed in a BACKWASH position, the third port is placed in communication with the water inlet port via the rotor chamber structure, and the second and fourth ports are placed in communication through the rotor chamber structure,
(d) there being a plug carried by the rotor for rotation therewith and to plug the fourth port when the rotor is in said FILTER position, and to plug the first outlet port when the rotor is in said BACKWASH position.

2. The combination of claim 1 wherein the water inlet port is centrally located and the four outlet ports are arranged in satellite relation about the inlet port.

3. The combination of claim 2 wherein said first through fourth ports are circularly spaced apart at approximately 60° angles.

4. The combination of claim 1 wherein the rotor has a WASTE position wherein the inlet port is placed in communication with said fourth port via the rotor chamber structure.

5. The combination of claim 1 wherein the rotor has a RINSE position wherein the second outlet port is placed in communication with the water inlet port via the rotor chamber structure, and the third and fourth outlet ports are placed in communication via the rotor chamber structure.

6. The combination of claim 1 wherein the rotor has a RECIRCULATE position, wherein the inlet port is placed in communication with said first outlet port via the rotor chamber structure.

7. The combination of claim 1 wherein the pool water inlet port is located at an axis defined by said rotor, and said first through fourth ports are spaced about said pool water inlet port in satellite relation.

8. The combination of claim 7, wherein the rotor defines multiple waterways, a first of which extends radially to communicate between the water inlet port and a selected one of the remaining ports depending upon the rotary position of the rotor.

9. The combination of claim 8 wherein a second of the waterways extends generally circumferentially about said axis to selectively intercommunicate two of said remaining ports depending upon the rotary position of the rotor.

10. The combination of claim 7 wherein the third outlet port is spaced from and circularly between the first and fourth ports, and the fourth port is spaced from and circularly between the second and third ports.

11. The combination of claim 1 including a pump connection to deliver water to said inlet port, and including said filter having opposite ends in communication with said second and third ports.

12. In a multi-ported backwash valve for a swimming pool and filter, the combination comprising
(a) a valve rotor and a body having five ports communicating with the rotor, said ports including
(i) a pool water inlet port,
(ii) a first outlet port for water delivery to the pool,
(iii) a second outlet port for water delivery forwardly through a filter,
(iv) a third outlet port for water delivery reversely through the filter, and
(v) a fourth outlet port for water delivery to waste,
(b) the rotor having water flow directing chamber structure characterized in that when the rotor is in a FILTER position the second outlet port is placed in communication with the water inlet port via the chamber structure, and the third and first ports are placed in communication through the rotor chamber structure, and
(c) when the rotor is placed in a BACKWASH position, the third port is placed in communication with the water inlet port via the rotor chamber structure, and the second and fourth ports are placed in communication through the rotor chamber structure,
(d) the water inlet port being centrally located and the four outlet ports being arranged in satellite relation about the inlet port, all five ports opening in one direction toward the rotor, and
(e) a plug carried by the rotor for rotation therewith and to plug the fourth port when the rotor is in said FILTER position, and to plug the first outlet port when the rotor is in said BACKWASH position.

13. The combination of claim 12 wherein said plug comprises a ball having an outer surface consisting of material selected from the group consisting of plastic and an elastomer.

14. In a multi-ported backwash valve for a swimming pool and filter, the combination comprising
(a) a valve rotor and a body having five ports communicating with the rotor, said ports including
(i) a pool water inlet port,
(ii) a first outlet port for water delivery to the pool,
(iii) a second outlet port for water delivery forwardly through a filter,
(iv) a third outlet port for water delivery reversely through the filter, and
(v) a fourth outlet port for water delivery to waste,
(b) the rotor having water flow directing chamber structure characterized in that when the rotor is in a FILTER position the second outlet port is placed in communication with the water inlet port via the chamber structure, and the third and first ports are placed in communication through the rotor chamber structure, and
(c) when the rotor is placed in a BACKWASH position, the third port is placed in communication with the water inlet port via the rotor chamber structure, and the second and fourth ports are placed in communication through the rotor chamber structure,
(d) the rotor having a WASTE position wherein the inlet port is placed in communication with said fourth port via the rotor chamber structure, and
(e) a plug carried by the rotor for rotation therewith and to plug the third port when the rotor is in said WASTE position.

15. In a multi-ported backwash valve for a swimming pool and filter, the combination comprising
(a) a valve rotor and a body having five ports communicating with the rotor, said ports including
(i) a pool water inlet port,
(ii) a first outlet port for water delivery to the pool, (iii) a second outlet port for water delivery forwardly through a filter,
(iv) a third outlet port for water delivery reversely through the filter, and
(v) a fourth outlet port for water delivery to waste,
(b) the rotor having water flow directing chamber structure characterized in that when the rotor is in a FILTER position the second outlet port is placed in communication with the water inlet port via the chamber structure, and the third and first ports are placed in communication through the rotor chamber structure, and
(c) when the rotor is placed in a BACKWASH position, the third port is placed in communication with the water inlet port via the rotor chamber structure, and the second and fourth ports are placed in communication through the rotor chamber structure,
(d) the pool water inlet port being located at an axis defined by said rotor, and said first through fourth ports being spaced about said pool water inlet port in satellite relation,
(e) the rotor defining multiple waterways, a first of which extends radially to communicate between the water inlet port and a selected one of the remaining ports depending upon the rotory position of the rotor, a second of the waterways extending generally circumferentially about said axis to selectively intercommunicate two of said remaining ports depending upon the rotory position of the rotor,
(f) a third of the waterways also extending generally circumferentially about said axis to selectively intercommunicate two of said remaining ports depending upon the rotary position of the rotor, said second and third waterways being spaced from one another about said axis.

16. The combination of claim 15 wherein said inlet port and said first through fourth ports open to the body interior at an internal wall of said body.

17. The combination of claim 16 wherein said first through fourth ports are spaced apart at approximately 60° angles.

18. The combination of claim 17 wherein said second outlet extends throughout approximately 60° about said axis.

19. In a multi-ported valve for combination with a filter, the combination comprising:
(a) a valve rotor and a body having five ports communicating with the rotor, said ports including
(i) a fluid inlet port,
(ii) a first outlet port for fluid delivery to a container,
(iii) a second outlet port for fluid delivery in a first selected path through filter means,
(iv) a third outlet port for fluid delivery in a second selected path through filter means, and
(v) a fourth outlet port for fluid delivery to discharge,
(b) said rotor having an axis and said body having an internal wall, said inlet port located at said internal wall, said first, second, third and fourth ports spaced about said axis,
(c) said rotor having a flow directing chamber to selectively place said inlet port in communication with said first through fourth ports, and other flow directing chamber structure to selectively and simultaneously intercommunicate pairs of said first through fourth ports,
(d) there being a plug rotatable in response to rotor rotation into different plugging positions relative to different of the ports and in one of which the third port is plugged when the pool water inlet port communicates with the fourth port.

* * * * *